US005343133A

United States Patent [19]

Malin et al.

[11] Patent Number: 5,343,133

[45] Date of Patent: Aug. 30, 1994

[54] ELECTRONIC POSTAGE METER HAVING MICROCOMPUTER-CONTROLLED MOTOR-PRINTWHEEL ALIGNMENT

[75] Inventors: Richard A. Malin; Arno Muller, both of Westport, Conn.

[73] Assignee: Pitney Bowes Inc., Stamford, Conn.

[21] Appl. No.: 782,212

[22] Filed: Oct. 24, 1991

[51] Int. Cl.[5] .............. H02P 8/00

[52] U.S. Cl. .............. 318/696; 318/685

[58] Field of Search .............. 318/685, 696

[56] References Cited

U.S. PATENT DOCUMENTS 4,519,048 5/1985 Abellana et al. .............. 318/685

4,745,346 5/1988 Muller .............. 318/685

*Primary Examiner*—William M. Shoop, Jr.

*Assistant Examiner*—Karen Mashih

*Attorney, Agent, or Firm*—Charles G. Parks, Jr.; Melvin J. Scolnick

[57] ABSTRACT

A postage meter comprises a non-volatile memory and a microcomputer in communication with the non-volatile memory. The microcomputer is operatively coupled to a stepper motor. The stepper motor includes a rotor and is arranged for positioning at least one printwheel of the postage meter. The non-volatile memory has stored therein a value corresponding to a predetermined pulse width required for pulsing a coil of the stepper motor to position the rotor to a final position between step positions. The microcomputer pulses the stepper motor coil with a pulse of the predetermined pulse with for bring the stepper motor rotor to a final position for positioning the printwheel.

4 Claims, 14 Drawing Sheets

ELECTRONIC POSTAGE METER HAVING MICROCOMPUTER-CONTROLLED MOTOR-PRINTWHEEL ALIGNMENT

RELATED APPLICATIONS

The following patent application includes material similar to that disclosed in the instant application: ELECTRONIC POSTAGE METER ASSEMBLY ENABLING CONNECTION OF ANY PRINTWHEEL SETTING MOTOR CONNECTOR TO ANY PRINTWHEEL SETTING MOTOR, Ser. No. 782,212, filed on Oct. 24, 1991.

1. Field of the Invention

The invention relates to electronic postage meters and more particularly to the control of motors for setting the printwheels in such electronic postage meters.

2. Background of the Invention

Electronic postage meters are well known. Such devices operate under microcomputer control to perform printing and accounting operations associated with the printing of a postal indicia on an envelope. Such accounting is based typically on encoded information as to the position of the printwheels which print the postal value.

Conventionally, it has been required that the stepping motors for driving the printwheels be aligned with respect to the gears and racks operating the printwheels during assembly so that driving the rotor of the stepper motor to a known position will precisely set the desired number on the respective printwheel into the printing location or at least within the tolerance for a mechanical rectifier assembly to provide the final precise alignment. This assembly procedure necessitates a highly complex alignment operation requiring an assembly person having special training and great skill.

Buan, U.S. Pat. No. 4,500,780 entitled APPARATUS AND METHOD FOR ALIGNING POSTAGE METER COMPONENTS WITH AN OPTICAL SENSOR describes a method of aligning the printwheels with respect to the motors during meter assembly. The fixture requires that adjustment be made on the assembly in order to assure registration between the encoded information and the value of the printwheel setting. U.S. Pat. No. 4,658,122 shows a stepper motor module having a yoke which is positioned in relation to the main shaft axis of the drum type postage meter for prealignment of the stepper motor to the printwheel setting mechanism.

While these work well, they require a substantial amount of assembly time by skilled workers, either during the course of construction of the meter in the case of the Buan reference or in the prealignment steps for the postage meter module.

Summary of the Invention

It is an object of the invention to minimize the physical assembly time for accomplishing the alignment between stepper motor and printwheel in a postage meter.

It is another object of the invention to provide a microcomputerized control of the adjustment of the stepper motor rotor with respect to the stators to provide final adjustment of the stepper motor with respect to the printwheel position.

These and other objects are accomplished by a postage meter comprising a non-volatile memory and a microcomputer communicating with said non-volatile memory, said microcomputer being operatively coupled to a stepper motor, said stepper motor having a rotor and being arranged for positioning at least one printwheel, said non-volatile memory having stored therein a value corresponding to a predetermined pulse width required for pulsing a coil of the stepper motor to move the rotor to a final position between step positions, and said microcomputer pulsing said stepper motor coil with a pulse of said predetermined pulse width for bringing said stepper motor rotor to a final position for positioning said printwheel.

Description Of the Preferred Embodiment

Figure 1:
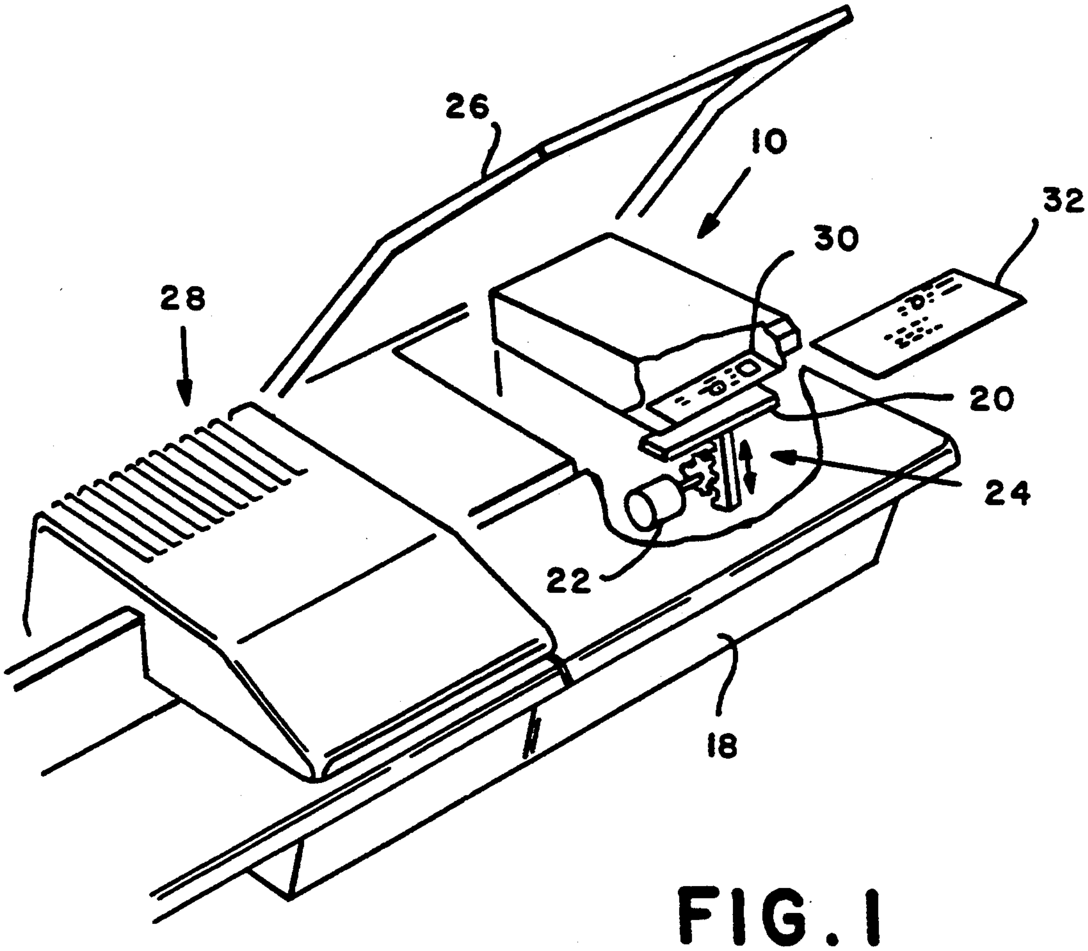
FIG. 1 is a perspective view of an electronic postage meter in which the invention may reside.

In FIG. 1, there is shown an electronic postage meter at 10. The meter 10 may have a keyboard and display (not shown in this figure) suitably covered by a door or a sliding fixture (also not shown). The meter 10 is shown installed in position on a mailing machine 18. The mailing machine 18 includes, as schematically shown, a printing platen 20 driven by motor 22 which reciprocates platen 20, suitably via rack and pinion gears 24. The entire meter is suitably enclosed in the mailing machine by hinged cover 26. Feeder module 28 feeds mailpieces to the base 18 which in turn transports the mailpiece to the space between the print die 30 and the platen 20 where upon reciprocation of the platen an imprinted indicia is placed upon the mailpiece as shown on mailpiece 32 being ejected from the mailing machine 18.

Printwheels (not shown in FIG. 1), set by stepping motors (also not shown in FIG. 1), are arranged to print postage value on the envelope in conjunction with the remainder of the indicia. Further aspects of this meter are detailed in U.S. Pat. No. 4,876,956 issued Oct. 27, 1989 entitled A REMOVABLE POSTAGE METER HAVING AN INDICIA COVER, assigned to the assignee of the present invention.

Figure 2:
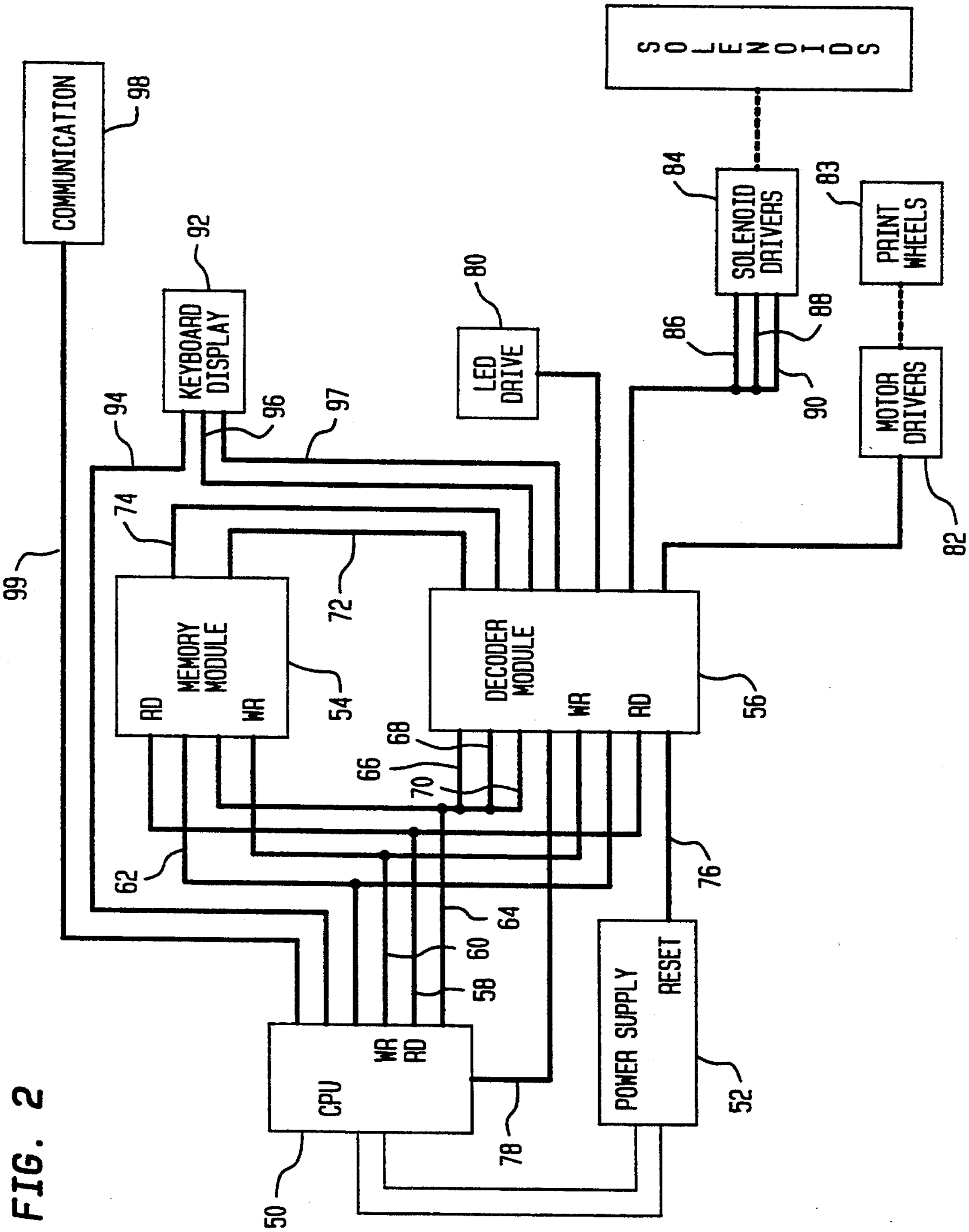
FIG. 2 is a schematic block diagram of the electronic postage meter.

FIG. 2 is a circuit block diagram of the electronic postage meter. As seen in FIG. 2, the Central Processing Unit (CPU) 50, suitably a Model 8031 available from Intel, Santa Clara, Calif., receives its power from the power supply 52. The CPU 50 communicates address and data signals along with memory READ and WRITE signals in known manner to memory module 54, which suitably comprises a ROM, RAM, and non-volatile memories as described, for example., in U.S. Pat. No. 5,012,425 entitled Electronic Postage Meter Having an Improvement in Non-volatile Storage of Accounting Data, assigned to the Assignee of the instant Application, and specifically incorporated herein by reference, or as described in U.S. Pat. No. 3,978,457, as well as to the decoder module 56. Read signals are transmitted to both on line 58 and WRITE signals on line 60, respectively. The multiplex address/data bus between the modules is shown at 62. Address bus 64 is also connected between the CPU 50 and memory module 54. The three highest order address lines 66, 68, and 70 are also connected to the decoder module 56. NVM READ and NVM WRITE signals are developed in the decoder module 56 under command of the CPU 50 and are connected to memory module 54 on lines 72 and 74.

The decoder 56 receives a CPU reset signal from power supply 52 on line 76 and with suitable internal logical manipulation in combination with other developed signals in the decoder module 56 provides a CPU reset signal to CPU 50 on line 78. A suitable circuit for providing a reset signal dependent on power and voltage conditions in the power supply is shown, for example, in Muller U.S. Pat. No. 4,547,853. A logic circuit for monitoring the reset from the power supply as well as other circuit parameters for developing a reset signal to the CPU is shown, for example in U.S. Pat. No. 4,747,057. A decoder chip is described in U.S. Pat. No. 4,710,882. As illustrated, the CPU 50 further communicates with LED drive module 80 to provide signals for the various sensors, the various stepper motor drivers (shown at 82) for positioning the postage meter printwheels (shown at 83), and solenoid drivers shown at 84 for controlling die-protector solenoids along lines 86, 88, and 90, respectively, through the decoder 56.

Keyboard display module 92 receives and displays information to the CPU 50 in conventional manner on line 94. Information is also provided from the keyboard of the keyboard/display module 92 to decoder 56 along line 96 in response to a strobe from the decoder 56 on line 97. External communications to the CPU are channelled through communication module 98 to the CPU on line 99. Typical features and the operation of postage meters are discussed, for example, in U.S. Pat. No. 4,301,507 and U.S. Pat. No. 4,484,307, both herein specifically incorporated by reference, and will not be further discussed except as required for the explanation of the operations in respect of the invention described below.

Figure 3:
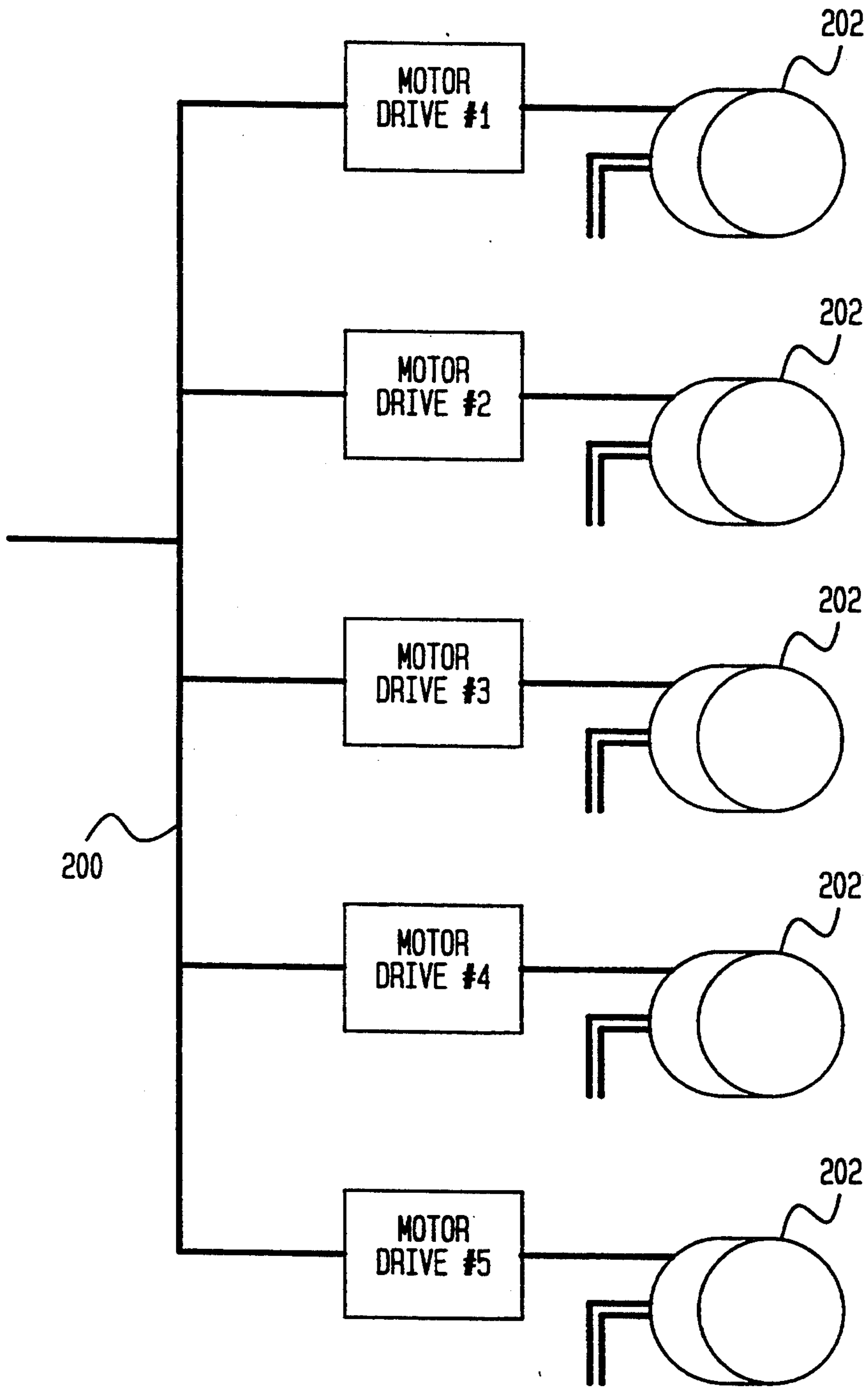
FIG. 3 is a schematic showing of a portion of the postage meter circuit showing the stepper motor.

FIG. 3 illustrates of a portion of meter circuit board bus 200 showing the respective motors 202 connected to respective motor driver 1 through 5. It will be appreciated that the motor driver output leads for a given motor are respectively identical to those for any other motor. In the particular embodiment shown, there are five sets of motor outputs corresponding to stepper motors for positioning five printwheels.

Figure 4:
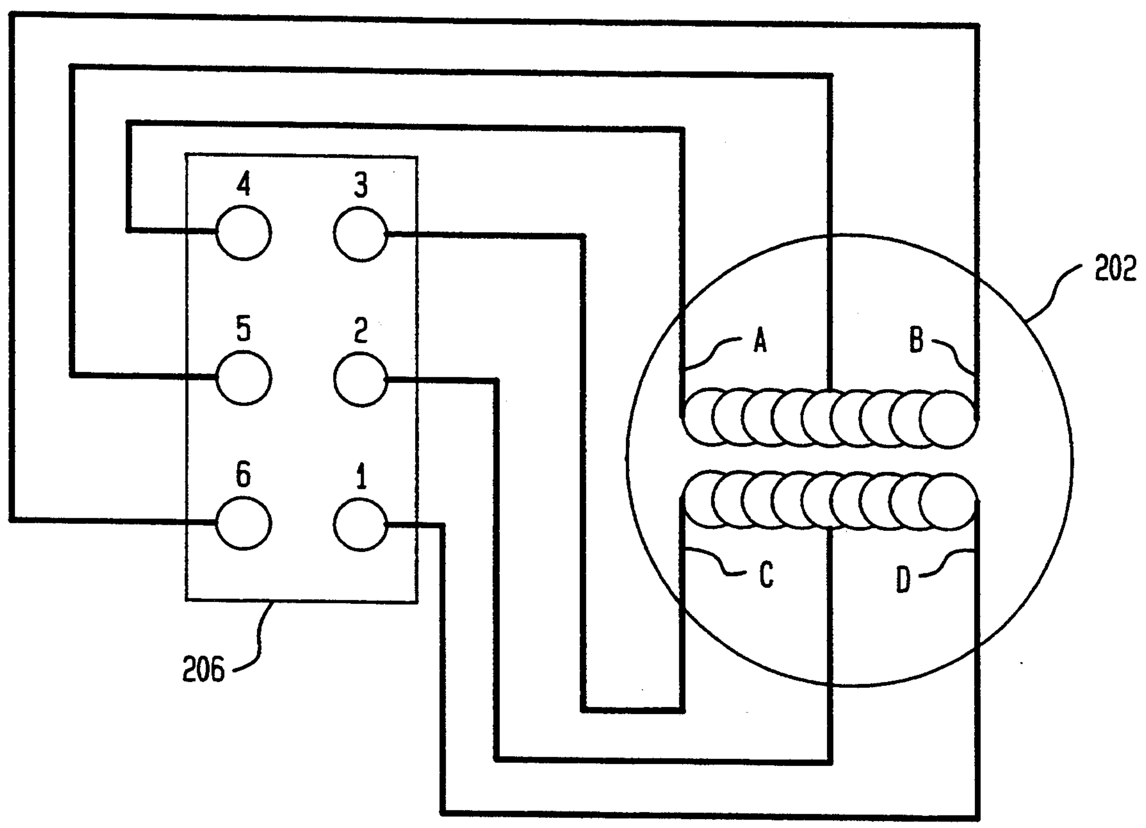
FIG. 4 is an end view of the motor connector housing showing the pin connections for the motor.

FIG. 4 shows at 206 the motor connector for an individual stepper motor. It will be understood that all motors in the postage meter are identical and any motor may be installed in any of the five mechanical positions and in accordance with the invention, connected to any of the five available terminal positions. Preferably, the motor leads are terminated in the six position housing with the pins in a 2×3 block as shown in FIG. 4. The coil center tap leads are in the middle, that is positions 2 and 5, and the other two leads from each coil are on the same side of the housing as the center tap. It will be understood that other configurations could be chosen so long as the convention is retained throughout the assembly of the meter, but this arrangement allows connection in either orientation of the connectors.

Figure 5:
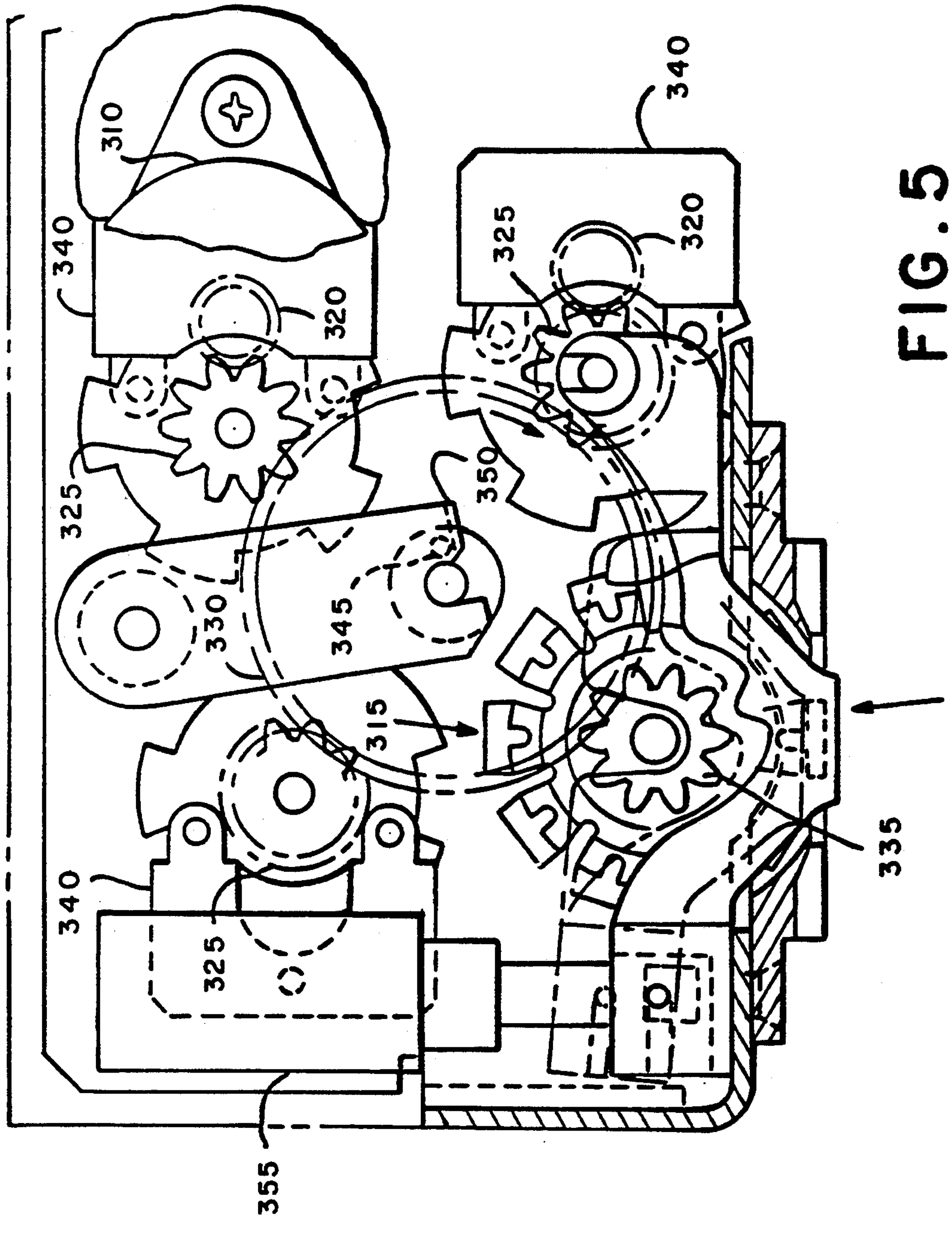
FIG. 5 is a side view of a suitable postage meter assembly for positioning a printwheel utilizing a stepper motor.

Turning now to FIG. 5, there is shown at 300 a portion of a printwheel setting mechanism suitable for setting print wheels in which the method in accordance with the invention may be utilized. Five stepper motors (only one of which is shown in broken lines at 310 for ease of view) are arranged to drive respective print wheels like the one shown at 315. Each motor drives its respective printwheel via respective motor pinions 320, encoder assembly gears 325, transfer gears 330, and printwheel gears 335 attached to the printwheels 315. Each gear train includes a two-channel encoder assembly designated herein by the number 340. Each encoder assembly gear 325 comprises a ten-tooth gear which meshes with the respective transfer gear 330 and a twenty-tooth coaxial gear that meshes with its respective motor pinion 320 and carries a planar wheel having alternating open and solid segments which extend into the sensor assemblies 340.

Each sensor channel in the sensor assembly 340 comprises a source, suitably an infrared-emitting diode and a detector, typically a photodiode with its associated circuitry. Such sensors are well known and will not be further discussed.

Preferably, as shown in FIG. 5, the encoder wheel operates to produce ten transitions per revolution as the encoder wheel passes through the sensor assembly and in each sensor channel alternately blocks and unblocks the radiation from the source. This results in two sensor transitions (one from each channel) for each move of one digit. The channels are physically separated and arranged such that as the encoder wheel rotates, the sensor outputs are in phase quadrature, that is, the output of one of the two sensors leads or lags the output of the other sensor by one quarter of a cycle.

The stepper motors 310 turn through a complete revolution in 24 steps which, as transmitted through the gear train illustrated in FIG. 5, require four motor steps for each change in digit of a printwheel. In the preferred embodiment, the stepper motors are four-phase motors driven by the motor drivers in a two-phase mode. The sensor transition points are nominally plus and minus one motor step from each digit's print position.

The transfer gears 330 are thirty-tooth gears that mesh with the respective printwheel gears 335 and the respective ten-tooth gears of the encoder gears 325. A protrusion 345 on each transfer gear in conjunction with a fixed element 350 provides an end stop or zero reference position for the transfer gear 330. It will be appreciated that when the protrusion 345 is adjacent the stop 350, there is a known fixed value for the printwheel digit in the die-print plane of the postage meter.

Solenoid 355 raises die-protector blades 360 to enable printing of postage and at other times extends below the plane of the printwheel print elements to prevent the wiping of indicia prints. Suitably a second rectifier solenoid (not shown) raises a second bank of rectifier blades (not shown) disposed between the remaining printwheels and when the blades are raised, the printwheels are brought into final position and locked into place by the tooth on each of the blades which engages the teeth of the respective printwheel gear 335.

For best results, the mechanical stop 350 is fixed nominally one motor step from the printing position and it will be appreciated from the foregoing that there are 27 useable printing positions between the mechanical stops.

Table 1 indicates a suitable arrangement for the printwheels and stepper motors in accordance with the invention.

TABLE 1

| BANK NUMBER | MSD 1 | 2 | 3 | 4 | LSD 5 |
|---|---|---|---|---|---|
| VALID SENSOR READINGS IN PRINT POSITION | 10 01 | 11 00 | 10 01 | 10 01 | 11 00 |
| MOTOR ROTATION DIRECTION TO INCREASE VALUES | CCW | CCW | CW | CW | CW |
| SENSOR SWITCHING FOR INCREASING VALUES* | CH B LEAD | CH A LEAD | CH A LEAD | CH A LEAD | CH B LEAD |

*LEAD-ONE CHANNEL TRANSITION LEADS THE OTHER CHANNEL TRANSITION BY APPROXIMATELY ONE QUARTER CYCLE. THERE IS ONE TRANSITION ON EACH CHANNEL PER DIGIT.

In accordance with an aspect of the invention, the information to be derived and stored in each meter comprises the following:

1. a motor number and an associated printwheel number, that is, which command lines move which printwheel.
2. the motor coil switching sequence for increasing print values.
3. motor stator alignment position for printing.
4. a valid sensor reading for printing a specific value, i.e, sensor reading 01 prints a value 3, etc.

Figure 6:
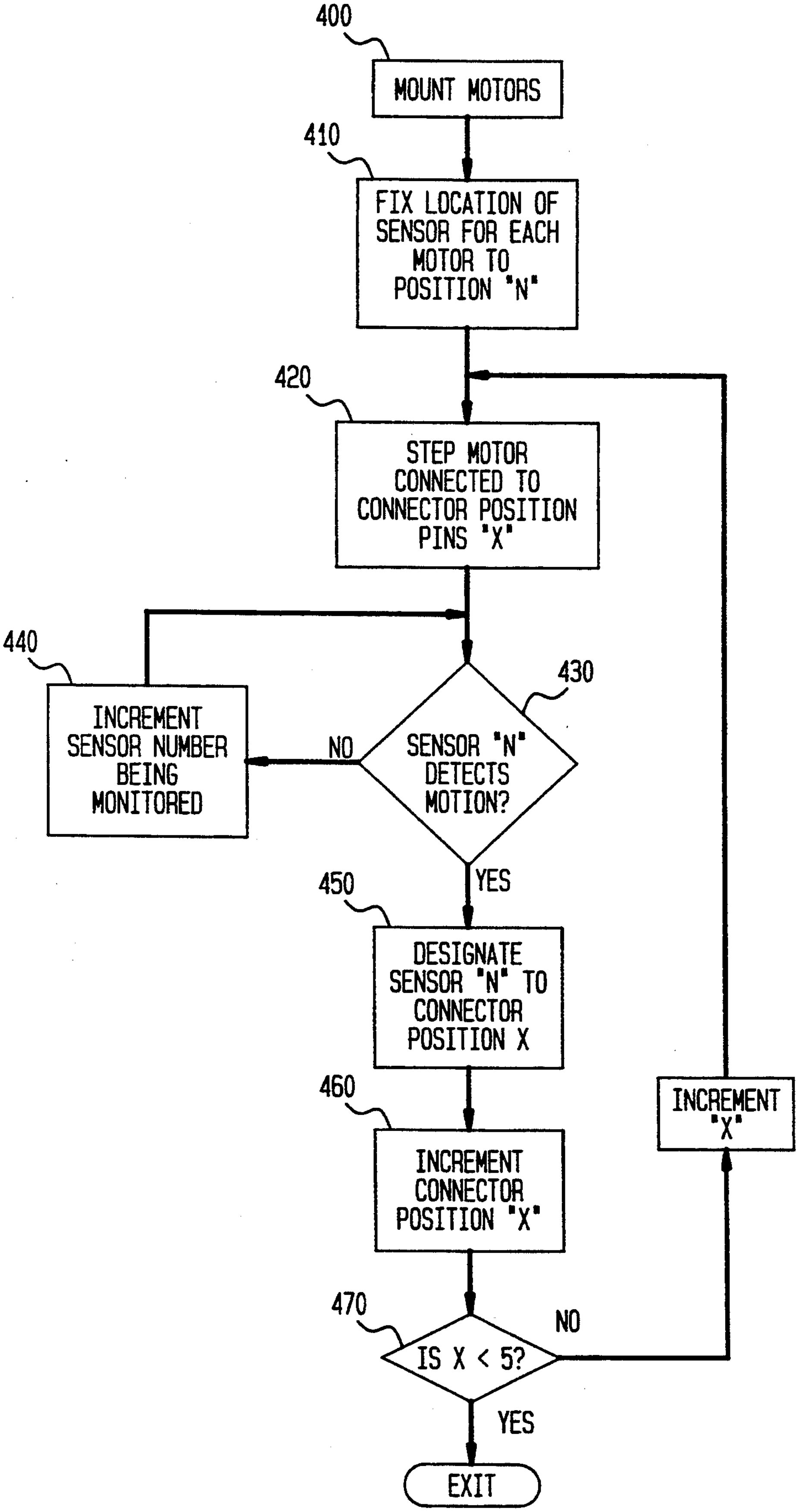
FIG. 6 is a flow chart describing in general terms the determination of a particular motor connector to be associated with a particular motor in an assembly in accordance with the invention.

FIG. 6 is a flow chart illustrating the operations of determining the motor versus print wheel bank as well as the coil change sequence versus the direction of travel for a given coil change.

The general procedure is as follows: With the dieprotector or rectifier solenoid degenerized, a step sequence is generated on each set of motor lines. The sensor outputs are analyzed to determine which printwheel has been actuated as well as the direction of the rotation. The printwheel bank number in the switching sequence for increasing values is recorded and stored in the non-volatile memory of the postage meter.

The flow chart of FIG. 6 depicts generally the means by which stepper motors or for that matter any other type of motor can be plugged into a random connector slot and then be identified with respect to a fixed value wheel position. It will be further appreciated that the sensors associated with this system can be optical, magnetic, and the like and are fixed in position suitably, for example, by being packaged and located at predetermined positions on a fixed flex strip.

As seen in FIG. 6, the first step, block 400, is to simply plug motors into motor connectors at random. In the present embodiment of the meter, for example, there are five motors. The second step is to fix the locations of the sensors in respective assemblies for each motor in a position N, block 410, suitably as before mentioned by means of packaging in a fixed flex strip that will allow no other than appropriate positioning. At block 420, a first motor is stepped by actuating the motor drivers connected to connector position pins X. At this point, the sensor N outputs are monitored, decision block 430, to detect whether sensor N detects the motion. For the sensor N being monitored, if no motion is detected, the NO path from decision block 430 causes the sensor number being monitored to be incremented, block 440, and the program loops to detect motion, again at block 430.

In the alternative, if the sensor N detects the motion, in the YES path from decision block 430, the associated sensor N is designated to correspond with connector position X for a particular postage value printwheel, block 450. In this case, the connector position X is incremented, block 460 and if X is less than 5, the NO branch of decision block 470 loops check to the next stepper motor connector position. After all sensors have been assigned to corresponding motor connector pins, the procedure is exited.

Figure 7A:
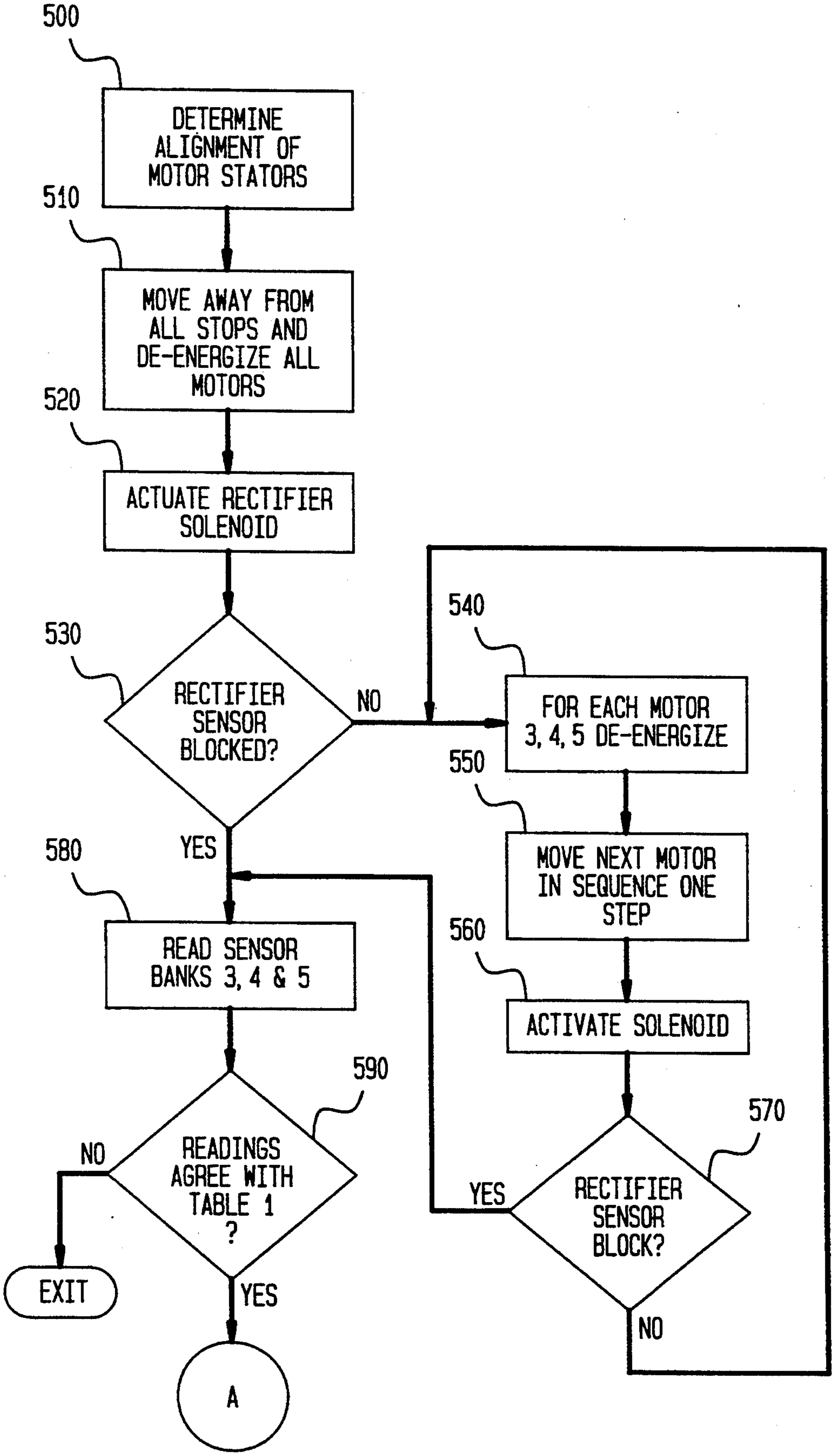
FIGS. 7A through 7C comprise flow chart showing a determination of the position of the rotor with respect to the stator and alignment of the printwheel position with respect to the stepper motor.
Figure 7B:
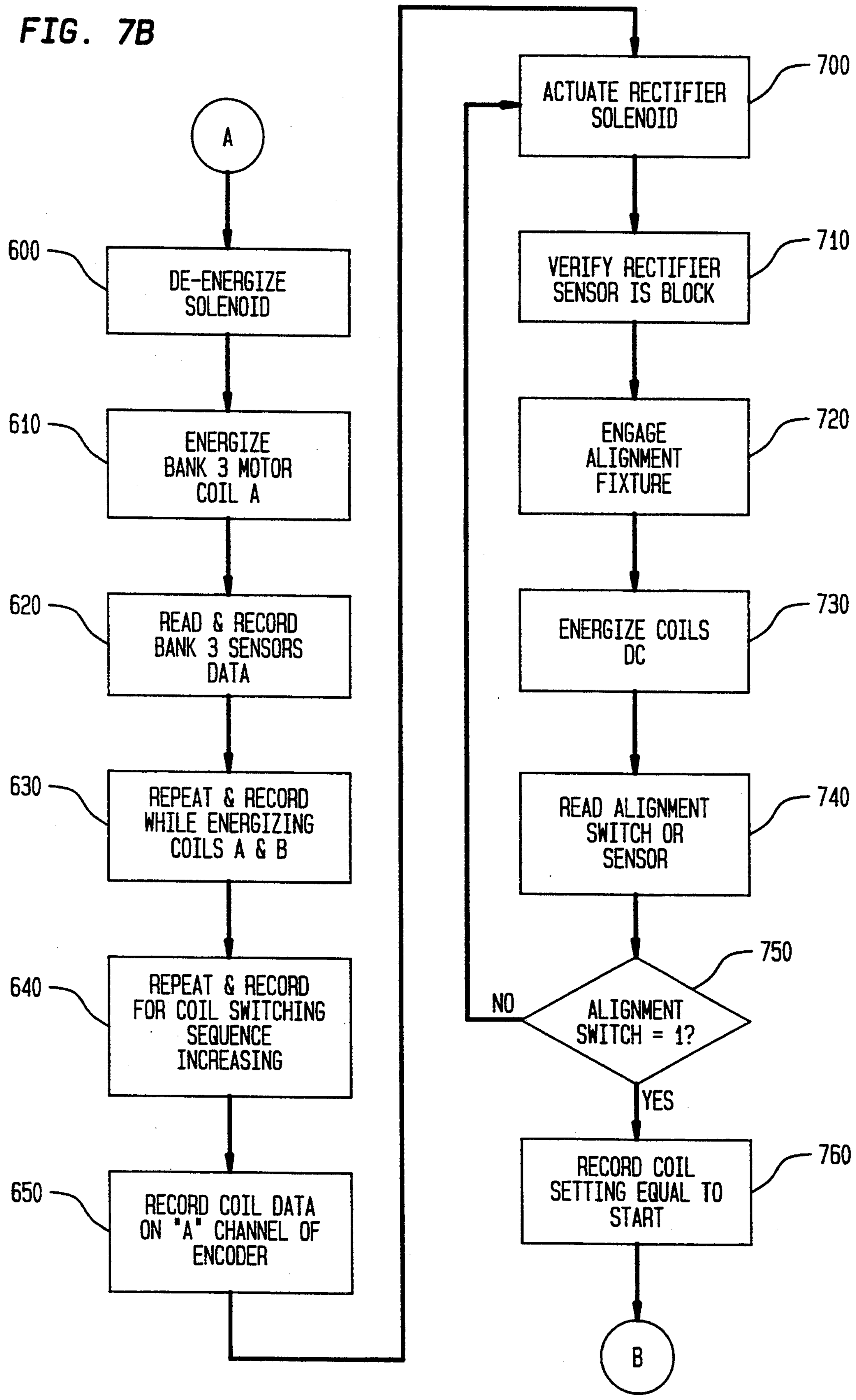
Figure 7C:
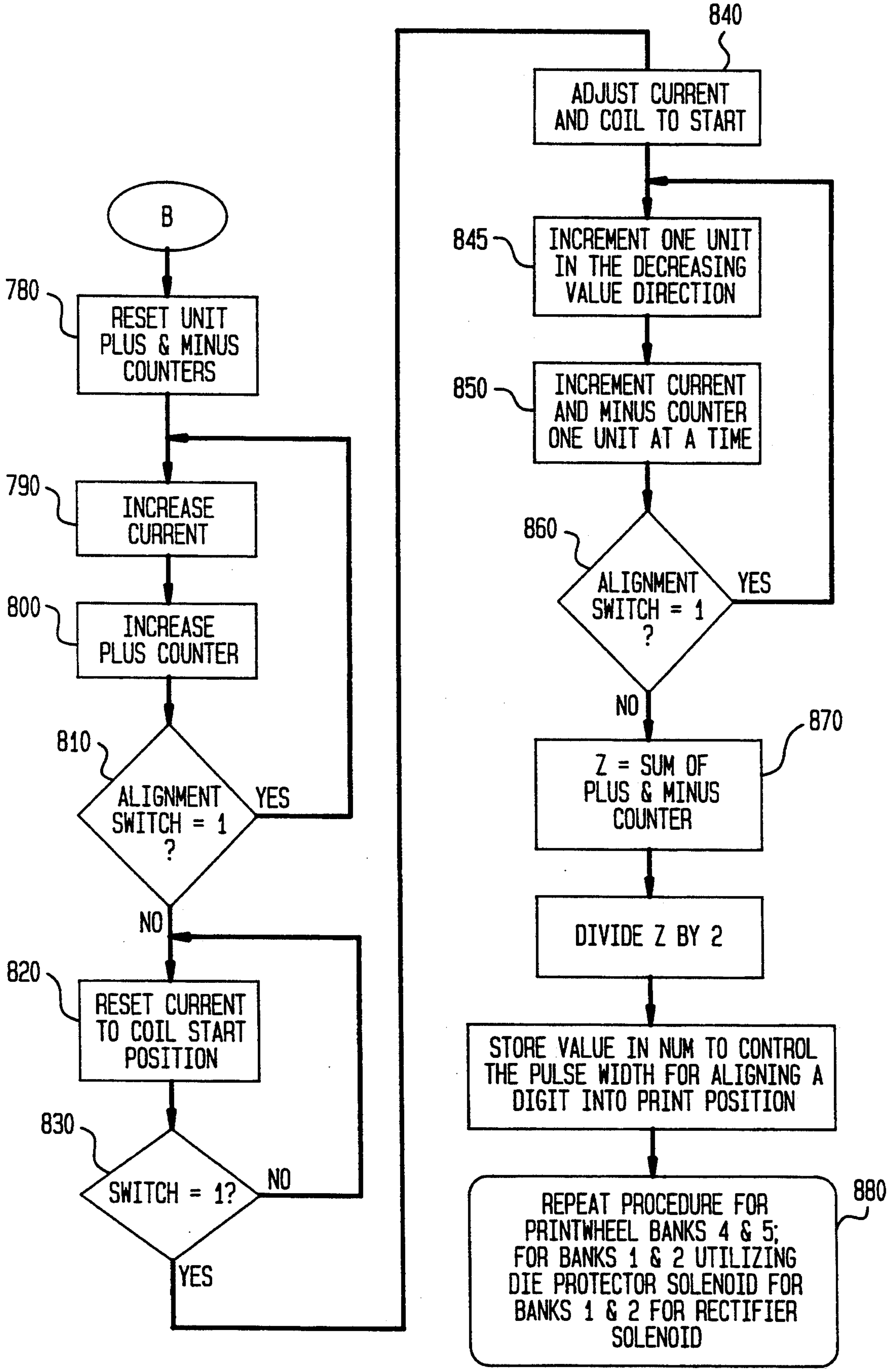

FIGS. 7A through 7C comprise a flow chart for a method for determining the alignment of the motor stators, starting at 500, for the stepper motor-printwheel drive arrangement of FIG. 5. It should be understood when the assembly is completed, each of the stepper motors 310 (FIG. 5) are randomly connected to the outputs from the circuit board and each has been installed in the postage meter assembly without any particular attempt for close alignment. It is assumed that the procedure described in connection with FIG. 6 has been completed and the appropriate motor assignments have been made and the motor coil switching sequence for the direction of rotation for increasing values for each motor has been determined.

At block 510, the motors are commanded to move away from all stops and then all the motors are de-energized. The rectifier solenoid, discussed in conjunction with FIG. 5, which acts specifically on printwheel banks 3 through 5 is then actuated, block 520.

The actuation of the rectifier solenoid is monitored to determine whether the rectifier blades have actually been pulled into position by determining whether an associated rectifier sensor has been blocked. It will be appreciated that if certain of the printwheels are not in the proper position, the rectifier solenoid will not be able to pull in the rectifier blades and thus the sensor will not be blocked. The rectifier sensor is checked, decision block 530, and in the event that the sensor is not blocked and the rectifier blades have not been able to move, the NO branch of decision block 530 proceeds to block 540 where the rectifier solenoid is de-energized and motor number 3, for example, is advanced one step, block 550, and the rectifier solenoid is again actuated, block 560. The rectifier sensor is checked, decision block 570. If it is still unblocked, the NO branch proceeds to loop back to de-energize the solenoid and to advance each motor one step in sequence until the rectifier sensor is blocked. At that point the YES branch from decision block 570 joins the YES branch from decision block 530.

Upon the rectifier sensor being blocked, the YES branch from decision block 530 or 570 falls to the read respective sensors in the banks for motors 3, 4, and 5, block 580. If the readings do not agree with those shown in Table 1, the routine is exited at the NO branch of decision block 590 since there is clearly an error.

Assuming that the readings taken do agree with those in Table 1, the YES branch from block 590 falls to again de-energize the rectifier solenoid, block 600. In blocks 610, 620, 630, and 640, the coil energization sequence for increasing-value rotation direction of bank 3 gear train is determined and recorded. And finally at block 650, the coil data is recorded for which the transition occurs on the A channel of the encoder. For the rest of the procedure discussed below, it will be assumed that this occurred with energization of coil "C".

The alignment procedure now proceeds into a second loop. In this loop, the rectifier solenoid is again actuated at block 700 and it is again verified that the rectifier sensor is blocked at 710.

Figure 8:
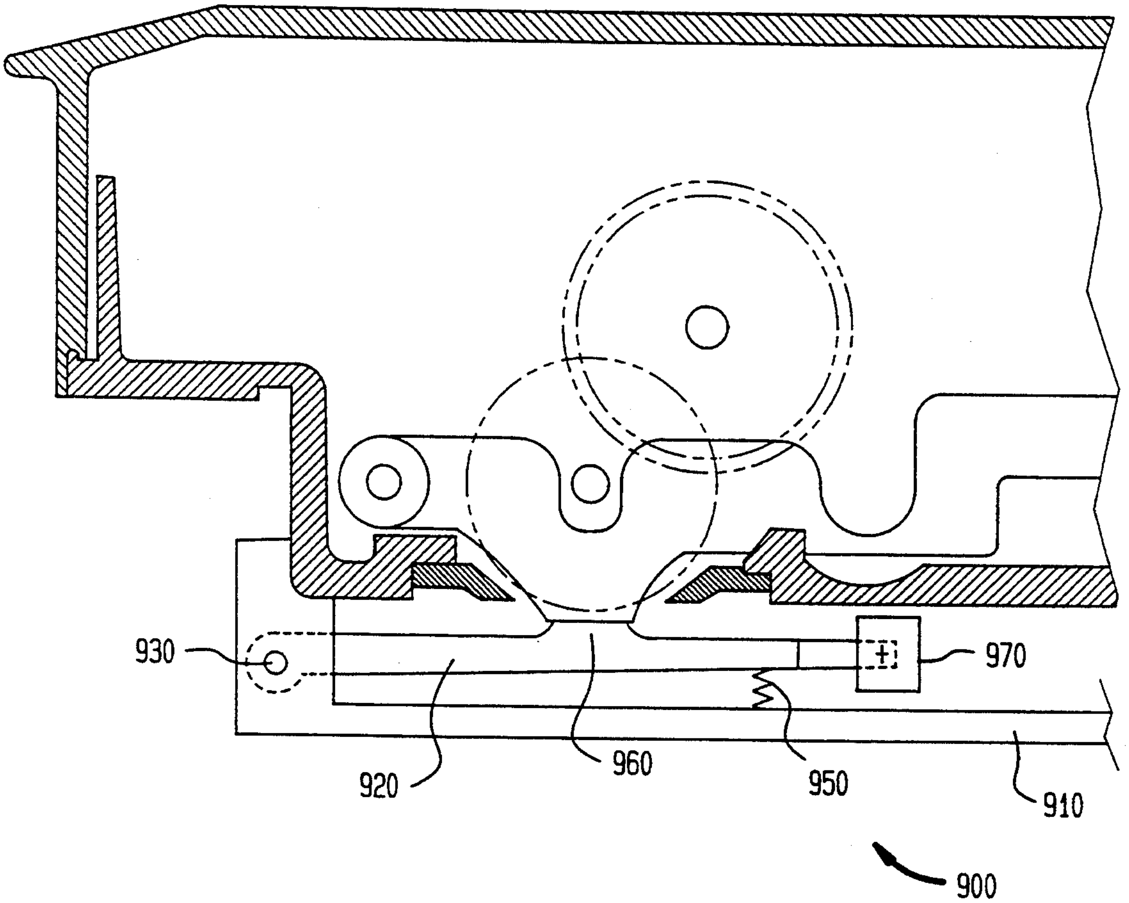
FIG. 8 is a side elevational view of the alignment fixture for use in determining the data in accordance with the procedure of FIGS. 7A through 7C.
Figure 8A:
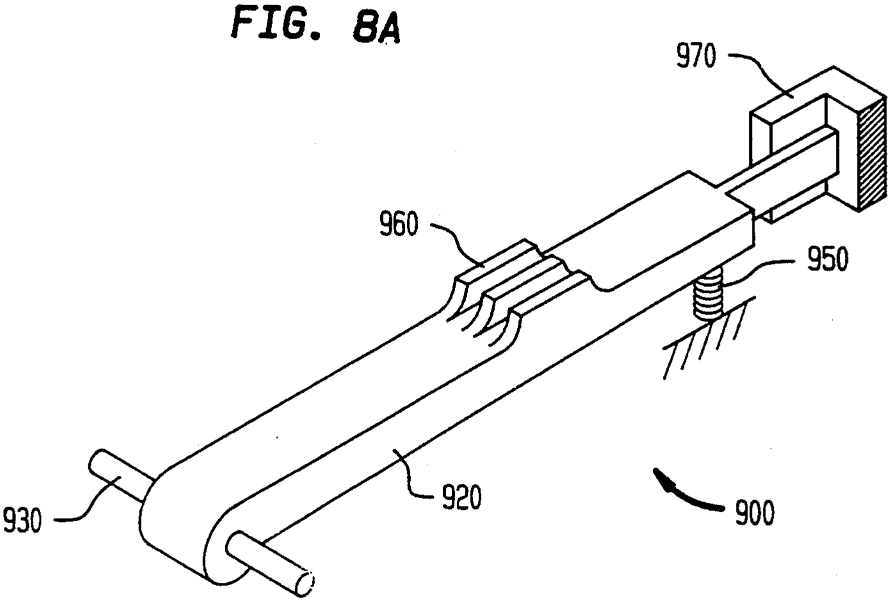
FIG. 8A is a perspective view of the counterbalance arm in accordance with the present invention.
Figure 9A:
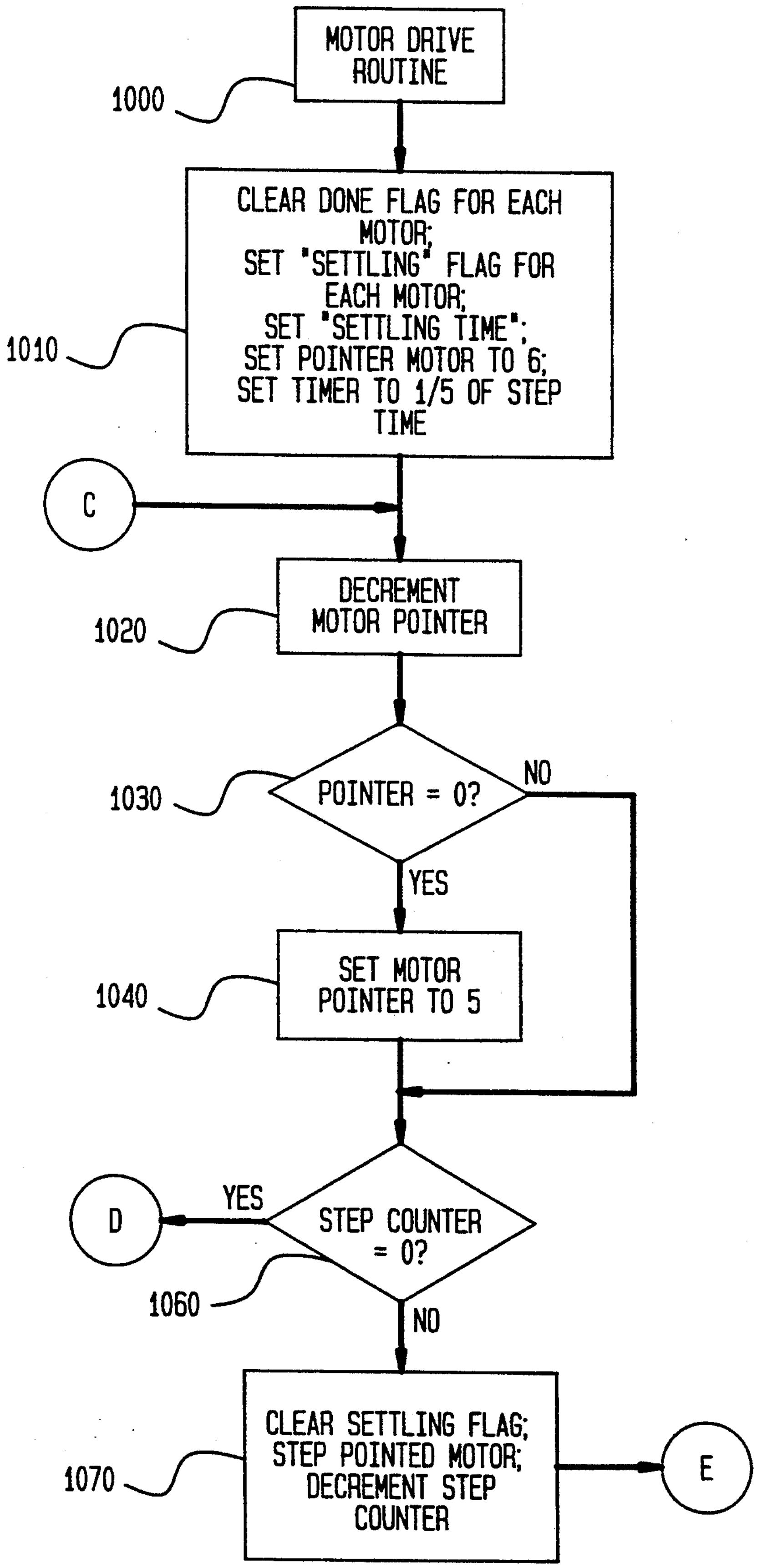
FIG. 9A through 9D is a flow chart illustrating the postage meter microcomputer routine for final microcomputer adjustment of the printwheels during printwheel setting operations in the postage meter.
Figure 9B:
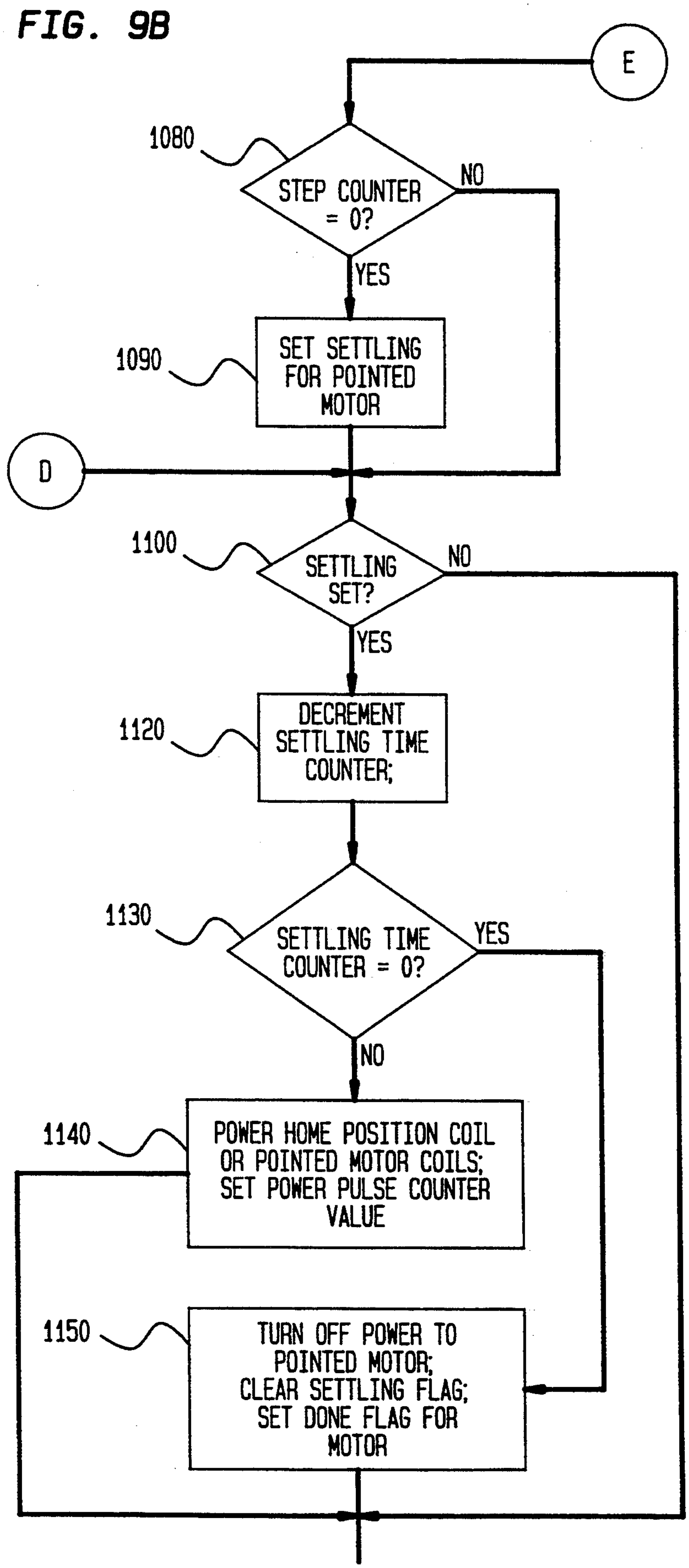
Figure 9C:
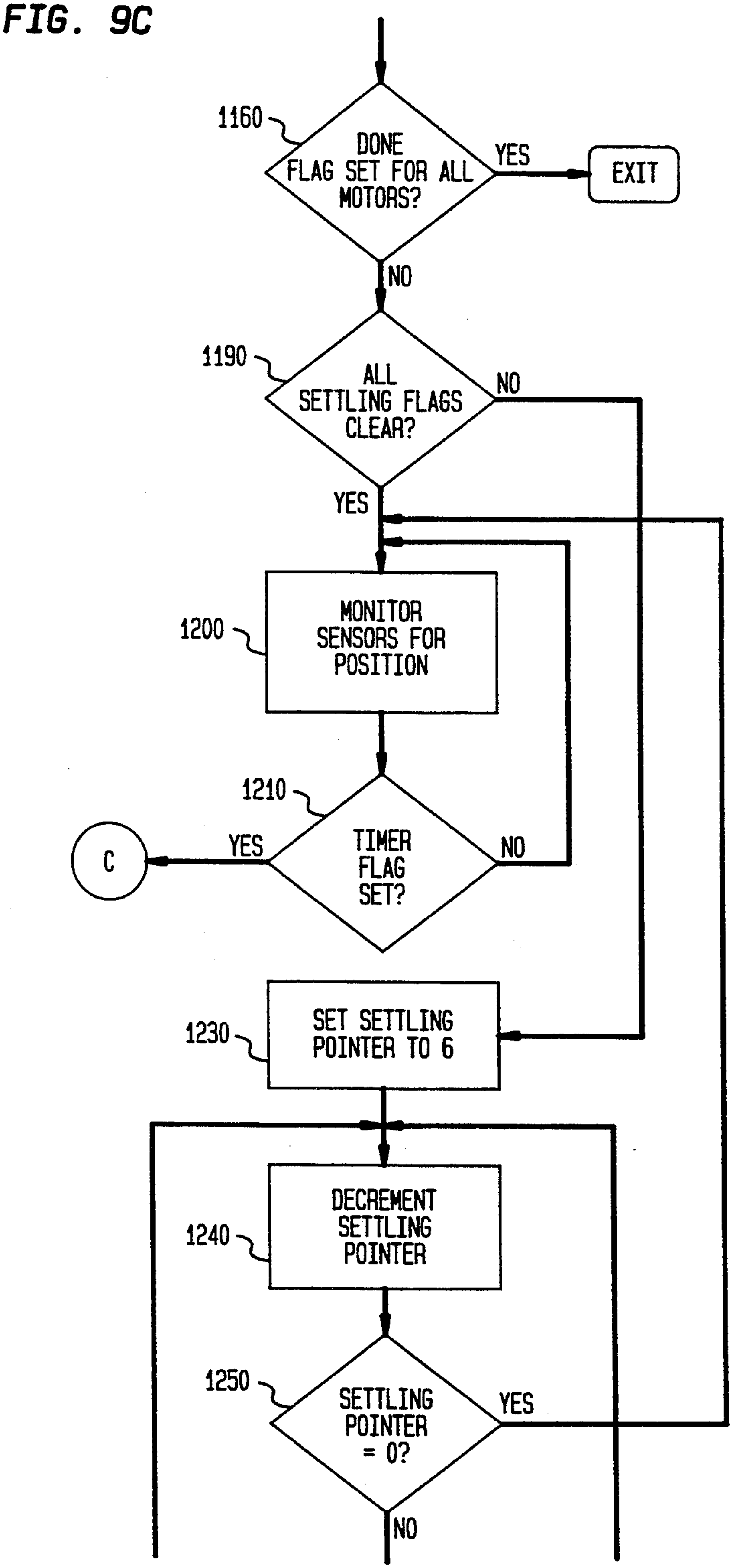
Figure 9D:
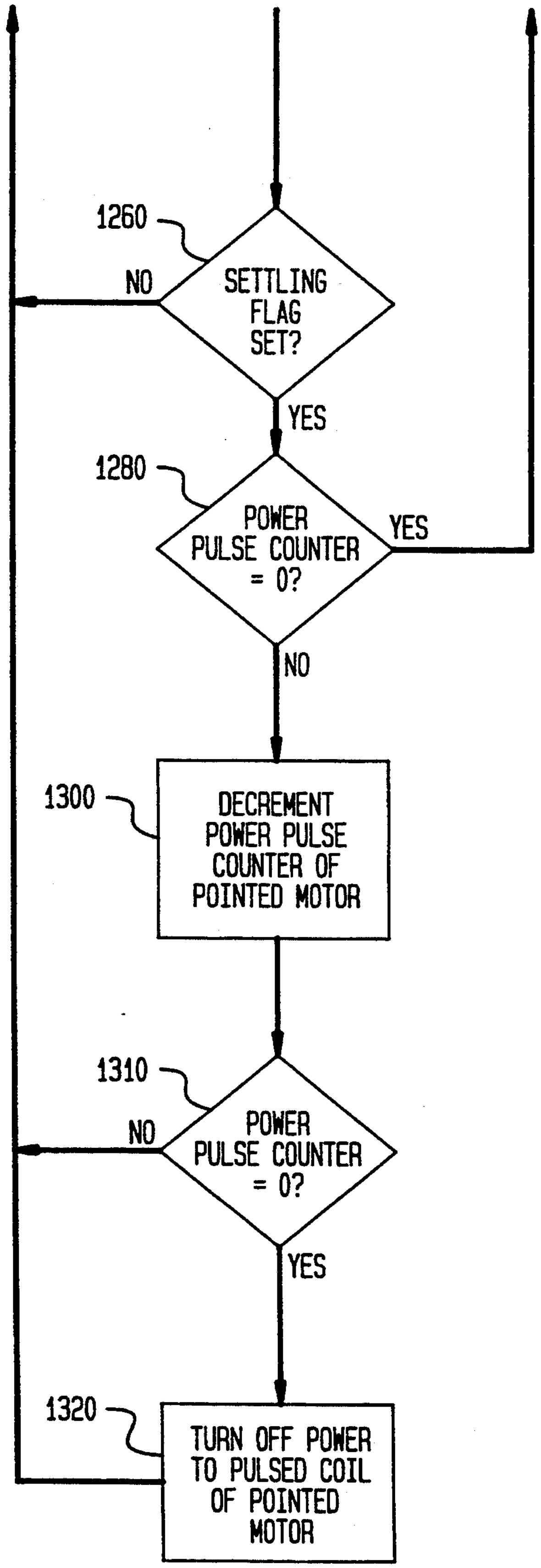

At this point, block 720, an alignment fixture shown in FIG. 8 is engaged to hold the rectifier in seated position when the rectifier solenoid is actuated.

Again assuming that coil C was the noted transition coil, the coils DC are energized, block 730 and the alignment switch or sensor is read, block 740. When the alignment switch equals 1, the rectifier is engaged. If the rectifier, as tested at decision block 750, is engaged, the YES branch falls to have the coil setting recorded as equaling the start position, block 760. If however, the switch does not equal 1, the NO branch from decision block 750 proceeds to repeat the coil actuation in the decreasing value direction in successive loops, block 760, until such time as the switch does test equal to 1 and then again falls to block 760 for recording the coil setting as equal to start.

At this point, unit plus and minus counters (which register the number of electrical current increments or units of a predetermined amount to total the actual current required for positioning the rotor) is reset, block 780. The current is increased in predetermined units in increasing value direction and counter is concurrently implemented blocks 790 and 800 for so long as the alignment switch remains equals to 1 as tested at decision block 810. The current is then returned to the coil start position block 820 and it is verified that the switch is equal to 1, block 830. The current and coil adjacent to the start at 840 and is incremented one unit in the decreasing value direction, block 845 and both the current and counters are incremented one unit at a time in block 850 until, as it is tested at block 860, the alignment switch is no longer equal to 1. The NO branch falls to block 870 where an algebraic sum of both the unit plus and unit minus counters is made and this value is divided by two at block 880. The procedure then loops back to repeat from the beginning for printwheel banks 4 and 5 of the postage meter and is also reiterated for banks 1 and 2 using the die protector solenoid for banks 1 and 2 in place of the rectifier solenoid described in the foregoing.

FIG. 8 is a side elevational view of the alignment fixture utilized in conjunction with the procedure of FIGS. 7A through 7C. The fixture 900 comprises a base 910 on which one end of a counterbalance arm 920 is pivotally mounted, suitably by a pin 930 extending through one end of the base. Spring 950 is disposed between the counterbalance arm 920 and the base 910 and is of a predetermined strength to hold the rectifier or die protector blades in place in mesh with the printwheel gears of the meter assembly with a predetermined force. In accordance with the procedure discussed with FIGS. 7A–7C, when the fixture is to be utilized, the fixture is arranged such that ear 960 on counterbalance arm 920 is in abutment to the die protector or rectifier blade and in conjunction with the spring 950 will continue to hold the blade in locking position even though the rectifier or die protector solenoid has been de-energized. Electro-optical position sensor 970 is arranged so that the end of counterbalance arm 920 will actuate the sensor by blocking and unblocking the sensor light path depending on its position. The signal provides an indication when the blade is moved from its locking position.

In accordance with the invention, the adjustment is accomplished by causing the meter microcomputer to adjust the rotor position to a predetermined angle with respect to the stator. This requires the delivery of different amounts of current as derived above to the two phases of the motor. A pulse width modulation is done by dividing the normal motor step time into smaller time increments and updating the output to the motors at this higher rate. The relative amounts of power and hence pulse widths are determined by the method illustrated in FIGS. 7A through 7C and the resulting values are stored in the non-volatile memory of the postage meter. This data is used every time the microcomputer is used to set the printwheels.

In order to make the description as simple as possible, assume that the microcomputer is driving a four phase unipolar stepper motor in single phase wave mode. The motor phases A, B, C, and D are powered in sequence for a period of 5 milliseconds each as shown in FIG. 4. When the motor has brought the printwheel to a position which is less than 1 full step away from the target position, it will typically only energize that particular phase. Assume that the microcomputer must be shared with other tasks such as driving other motors so that it updates the state of the control lines for this motor at 5 millisecond intervals. The other tasks are all scheduled into equal intervals of 1 millisecond. The routine then has to switch tasks every millisecond and it is possible to set up flags to allow utilization of several instructions at each task change without effecting the overall operation of the meter. This operation is shown more completely in the routine illustrated in FIGS. 9A–9D. The microcomputer thus turns on the second phase of the motor for shorter than 5 millisecond periods to bring the motor closer to the final aligned position.

FIGS. 9A–9D comprise a flow diagram of the postage meter microcomputer routine for final alignment of the rotors of the meter stepper motors in accordance with the invention during the postage meter setting operation.

The motor drive routine is shown at 1000. At block 1010, a "DONE" flag for each motor is cleared, a "SETTLING" flag for each motor is set, a "SETTLING TIME" counter is set, a motor pointer is set to 6, and a timer is set for 1/5 step time. The motor pointer is then decremented, block 1020, the value of the pointer is checked at decision block 1030 and if "0", the YES branch proceeds to set the motor pointer to 5 and rejoins the NO branch from decision block 1030 where the routine proceeds to check the step counter of the pointed motor, 1060.

If the motor has not attained the last full step, that is if the step counter has not reached "0", The NO branch of decision block 1060 proceeds to block 1070 where the SETTLING flag is cleared and the pointed motor is stepped. The step counter is also decremented and then tested at decision block 1080. If the step counter has not reached "0", the NO branch of the routine from block 1080 continues as described below. If the counter has reached "0", the YES branch from decision block 1080 proceeds to block 1090 where the "SETTLING" flag for the pointed motor is set and the routine joins the NO branch of block 1080.

Returning now to decision block 1060, if the step counter is "0", the YES branch leads to block 1100 where the SETTLING flag is checked. If the flag is not set, the NO branch from decision block 1110 continues as described further below. If the flag is set, the YES branch from block 1110 proceeds decrement the SETTLING TIME counter, block 1120, and tests whether it has reached "0", decision block 1130.

If the counter has not reached "0", the NO branch proceeds to block 1140 where the HOME position coil or coils of the pointed motor are powered and a power pulse counter value is set for that motor in accordance with the data stored in nonvolatile memory which has been derived as described in conjunction with FIGS. 7A-7C. The YES branch from decision block 1130 turns off the power to the pointed motor, clears the SETTLING flag, and sets the DONE flag for the motor, block 1150. The branches of the routine merge at this point and fall to block 1160 where the DONE flags of all the motors are checked and if all are set, the YES branch of decision block 1170 exits the routine. If the motors have not all been set, the NO branch from block 1170 proceeds to block 1180 where the SETTLING flags of all motors are checked. If all are clear, the YES branch from decision block 1190 causes the sensors to be monitored to keep track of position, block 1200, the timer flag is checked, block 1210, and if it is not set, the NO branch from decision block 1220 loops back to block 1200. The YES branch loops back to block 1020 where the motor pointer is decremented and the loop is repeated until the routine is exited when all motors are set.

Returning now to decision block 1190, if all SETTLING flags are not cleared, the NO branch proceeds to block 1230 where a SETTLING pointer is set to 6 and then decremented at block 1240. If the pointer has been decremented to "0", the YES branch from decision block 1250 goes to block 1200 previously described for monitoring the sensors. The NO branch from decision block 1250 proceeds to block 1260 to check the SETTLING flag of the pointed motor. If the flag is not set, the NO branch from decision block 1270 loops back to block 1240 to decrement the SETTLING pointer. The YES branch falls to block 1280 for checking the power pulse counter of the pointed motor If it has reached "0", the YES branch of the routine from decision block 1290 loops back as described previously to block 1240.

If the counter has not reached "0", the NO branch falls to block 1300 for decrementing the power pulse counter of the pointed motor and the counter is tested at block 1310. If the counter has not reached "0", the NO branch loops back to block 1240. If it has reached "0", power is turned off to the pulsed coil of the pointed motor and the routine loops back to block 1240.

The operation of the postage meter printwheel setting mechanism in accordance with the invention will now be described. The pulse widths necessary for the final positioning for each printwheel are derived and stored in the non-volatile memory of the postage meter. When a meter command is received to set the printwheels to print the value $0.25, the two lowest denomination printwheel banks are to be set to 2 and 5 while the others are to be set to "0". The step counter for each motor is set to the appropriate value to bring the printwheel to the required position and each motor is stepped to the closest full step to bring the printwheel the closest to its final alignment.

As the motors reach this position, the HOME position coil or coils are powered by pulses of the required width to change the angular orientation of the stepper motor rotors to bring each printwheel to a final position within the tolerance of the rectifier blades ability to finally align the printwheels into printing position.

What is claimed is:

1. A postage meter comprising:

a housing, stepper motor fixably mounted to said housing having a rotor, at least one print wheel rotatively mounted in said housing having a plurality of characters formed on the peripheral surface of said print wheel in respective character positions, said print wheel being mounted such that each of said character positions can be respectively aligned to a reference position of said housing in response to actuation of said stepper motor rotor, a non-volatile memory and a microcomputer communicating with said non-volatile memory, said microcomputer being operatively coupled to a stepper motor, said stepper motor having a rotor, said non-volatile memory having stored therein a value corresponding to a predetermined pulse width required for pulsing a coil of the stepper motor to an incremental position between said reference position, means for monitoring the position of said print wheel relative to said reference and communicating said position to said microcomputer, and, said microcomputer being programmed to pulsing said stepper motor coil with a plurality of pulse width serially until said stepper motor rotor is pulse to cause one of said printwheel character to be aligned to said reference position.

2. A postage meter as claimed in claim 1 wherein said printwheel has an initial position relative to said reference position and said microcomputer being further programmed to first cause said printwheel to assume an initial position.

3. A postage meter as claimed in claim 2 wherein said means for monitoring the position of said printwheel is detachably mounted to said postage meter housing.

4. A postage meter comprising:

a housing, a plurality of stepper motors fixably mounted to said housing, each of said stepper motor having a rotor, a plurality of printwheels rotatively mounted in said housing having a plurality of characters formed on the peripheral surface of each of said printwheel in respective character positions, each of said printwheels being mounted such that each of said character positions of said respective printwheels can be respectively aligned to a respective reference position of said housing in response to actuation of said stepper motor rotor, a non-volatile memory and a microcomputer communicating with said non-volatile memory, said microcomputer being operatively coupled to each of said stepper motors, said stepper motors having a respective rotor, said non-volatile memory having stored therein a value corresponding to a predetermined pulse width required for pulsing a coil of said stepper motors to an incremental position between said reference position, said printwheels have an initial position relative to said reference position and said microcomputer being further programmed to first cause said respective printwheels to assume an initial position, means for monitoring the position of said respective printwheels relative to said reference and communicating said respective positions to said microcomputer, and, Said microcomputer being programmed to pulsing said respective stepper motor sequentially coil with a plurality of pulse width serially until said stepper motor rotor is pulse to cause one of said printwheel characters to be aligned to said reference position.

* * * * *